Patented June 24, 1952

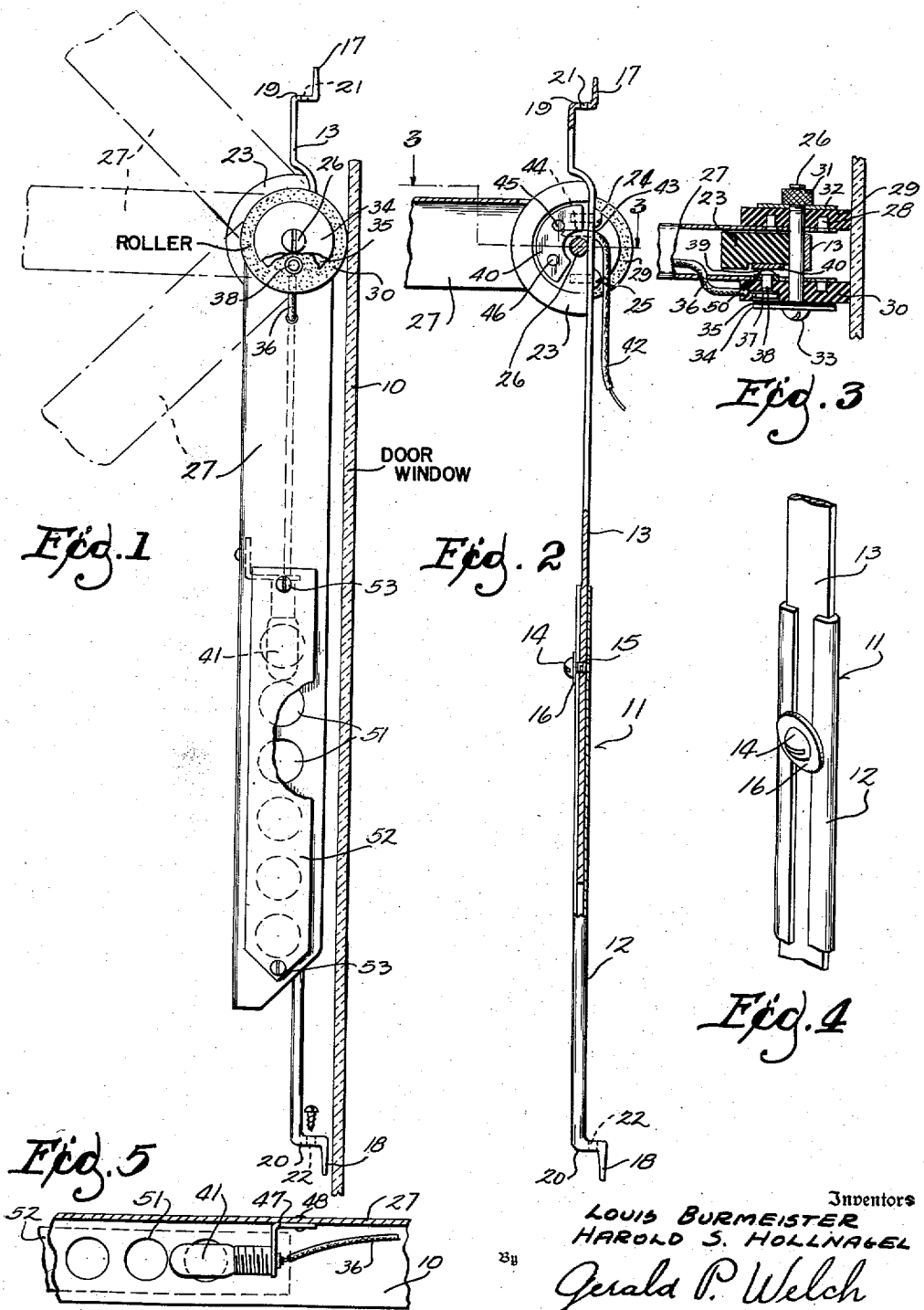

2,601,587

UNITED STATES PATENT OFFICE 2,601,587

DIRECTIONAL SIGNAL FOR VEHICLES

Louis Burmeister and Harold S. Hollnagel, Milwaukee, Wis.

Application November 23, 1949, Serial No. 129,042

3 Claims. (Cl. 177—327)

This invention relates to improvements in directional signals for automobiles, and more particularly to a novel directional signal operable in part by movement of an automobile door window.

An object of the invention is to provide a device of the type including a signal light and having a semaphore arm operable by frictional contact with a door window glass, as the same is raised or lowered by the automobile driver.

Another object of the invention is to provide a device of the type which is operable both by slight movement of an automobile door window and which may be operable manually in an easy and efficient manner.

Other and further objects of the invention will appear as the description proceeds, reference being had to the accompanying drawing in which—

Fig. 1 is a side view partially broken away of a directional signal device embodying the invention.

Fig. 2 is a vertical sectional view of the same.

Fig. 3 is a view on line 3—3 of Fig. 2.

Fig. 4 is a fragmentary perspective view of the telescopic attachment arm.

Fig. 5 is a fragmentary sectional view of the signal arm showing the light bulb therein.

Referring more particularly to the drawing, the numeral 10 refers to an automobile door window glass which may be raised and lowered in the conventional manner, as by a crank or other means. A telescopic attachment arm 11 is formed of a flat channel 12 and the bar 13. A screw 14 is fixed in the channel 12 at 15 thereof and with a washer 16 is used for fixing the bar 13 in the channel 12 against movement thereof after the proper adjustment has been secured. The end portions 17 and 18 are adapted for insertion between the metal and the weatherstrip of the car adjacent the car window 10. The portions 19 and 20 are adapted to abut against metal portions of the door and are drilled at 21 and 22 for the insertion of metal screws to secure the assembly. An insulating block 23 is attached to the bar 13 by threaded means 24 and 25 holding a shaft 26 in contact with said bar 13. A channel shaped semaphore arm 27 is attached by means of rivets 28 to a pair of resilient rollers 29 and 30. The shaft or bolt 26 has a nut 31 which is drawn up against a washer 32 in contact with the roller 29. A head 33 on the bolt 26 retains a washer 34 in contact with an insulating washer 35 which in turn abuts the roller 30. A wire 36 which is connected with the light bulb 41 is connected at 37 with a bolt 38 which latter has an integral brush head 39 which is adapted to contact slidingly a metal segment 40. A wire 42 which may be connected to a source of current supply is passed through an aperture at 43 of the bar 13, thence through a drill hole at 44 of the block 23 to a connection with the post 45 which with a similar post 46 retains the metal segments 40. The light bulb 41 is grounded by the bracket 47 in which it is held. The bracket 47 is secured to the arm 27 by the rivet means 49.

In use, the assembly is to be attached to an automobile in such a manner that the rollers 29 and 30 will be in contact with the vertically adjustable window glass 10 of the car door unless the said window is entirely open. When the window glass 10 is open and down, the signal may be manipulated by simply grasping the roller 30 in the left hand, when it will be found a simple matter to raise the semaphore arm to the required position or positions for directional signaling as provided by law. When the window is closed, the normal operation thereof causing the glass to frictionally turn the rollers 29 and 30 will likewise operate the semaphore arm in an efficient manner. As the window is lowered, the rollers 29 and 30 will be turned clockwise, causing the brush 39 to engage the segment at its lower end thus closing the electrical circuit and lighting the bulb 41. The electrical current will enter through wire 42, proceed through the post 45 to the segment 40, thence through the brush head 39 through the element 38 to the wire 36 to energize the bulb 41 from whence it is grounded through the bracket 47 and semaphore arm 27. The brush head 39 is insulated by a washer 50 from the semaphore arm 27. The light 41 is visible rearwardly and forwardly of the vehicle because of a plurality of apertures 51 disposed in the front and back portions of the semaphore arm 27 and preferably covered with colored glass plates 52 held in place by threaded means 53.

It will be understood that the device is capable of many modifications in structure and design, without departing from the spirit of the invention, within the scope of the appended claims.

Having thus described the invention, what is claimed and desired to be secured by Letters Patent of the United States, is:

1. A direction signal for automobiles comprising an attachment arm for securing the same to the left front door of an automobile adjacent to the window thereof, a semaphore arm pivoted to said attachment arm, resilient roller means fixed to said semaphore arm and operable to lift said arm by friction with the door window, an electric bulb disposed in said semaphore arm, and means for closing an electrical circuit and energizing said light bulb during a portion of the movement of said semaphore arm.

2. A directional signal for automobiles comprising a telescopic attachment arm for supporting the same adjacent the window of the left front door, a semaphore arm pivoted to said telescopic attachment arm, rubber rollers fixed to said semaphore arm adapted to engage frictionally with the glass of said door window, an electric light disposed in said semaphore arm, and brush means for closing a circuit throughout a portion of the movement of said semaphore arm.

3. A device of the character described including an attachment arm comprised of a flat channel, a bar engaged therein and adjustable longitudinally thereof, offset end portion on both parts engageable between the metal and weatherstripping of an automobile car door, a round block secured adjacent one end of said bar member, an arcuate metal contact member fixed to a side of said block, a semaphore arm pivoted to said block, rubber rollers fixed to said semaphore arm adapted to engage frictionally with the glass of the window of said door, an electric light disposed in said semaphore arm, and means on said arm to brush said contact member to close an electrical circuit and energize said light during a portion of the movement of said semaphore arm.

LOUIS BURMEISTER.
HAROLD S. HOLLNAGEL.

REFERENCES CITED

The following references are of record in the file of this patent:

UNITED STATES PATENTS

| Number | Name | Date |
|---|---|---|
| 1,388,675 | Turner et al. | Aug. 23, 1921 |
| 1,705,922 | Ingram | Mar. 19, 1929 |
| 1,732,794 | Bersaques | Oct. 22, 1929 |
| 1,744,794 | Pohlmann et al. | Jan. 28, 1930 |
| 1,827,289 | Hayward | Oct. 13, 1931 |
| 2,521,858 | Levy | Sept. 12, 1950 |